United States Patent [19]

Gale

[11] Patent Number: 4,647,251
[45] Date of Patent: Mar. 3, 1987

[54] INSTALLATION OF COMMUNICATIONS CABLES

[75] Inventor: John C. Gale, Swindon, United Kingdom

[73] Assignee: Cabletime (Installations) Limited, Washington, D.C.

[21] Appl. No.: 534,326

[22] Filed: Sep. 21, 1983

[30] Foreign Application Priority Data

Sep. 22, 1982 [GB] United Kingdom ............... 8227065
Sep. 9, 1983 [GB] United Kingdom ............... 8324177

[51] Int. Cl.⁴ .................................................. F16L 1/02
[52] U.S. Cl. ......................................... 405/154; 248/49
[58] Field of Search ............... 405/154, 156, 157, 174, 405/184, 288, 150; 248/49

[56] References Cited

U.S. PATENT DOCUMENTS

| | | | |
|---|---|---|---|
| 3,862,349 | 1/1975 | Watts | 405/157 X |
| 4,069,684 | 1/1978 | Wilson | 405/157 |
| 4,251,168 | 2/1981 | Groetschel | 405/288 |
| 4,350,548 | 9/1982 | Zenbayashi et al. | 405/150 X |
| 4,354,774 | 10/1982 | Bianchi et al. | 405/157 |
| 4,492,493 | 1/1985 | Webb | 405/154 X |

FOREIGN PATENT DOCUMENTS

| | | | |
|---|---|---|---|
| 1492 | 1/1977 | Japan | 405/154 |
| 51595 | 4/1977 | Japan | 405/154 |
| 2040599 | 8/1980 | United Kingdom | 405/154 |

*Primary Examiner*—David H. Corbin
*Attorney, Agent, or Firm*—Watson, Cole, Grindle & Watson

[57] ABSTRACT

For running communication cables to dwellings and other buildings to enable the distribution of information (e.g. in a cable television system) to or collection of information from those buildings, use is made of the pre-existing underground pipes which serve to drain sewage and/or surface and storm water away from those buildings. The cables preferably are secured to the surface of the sewage-draining pipes, preferably along the soffit of those pipes and for example by clips fixed at intervals.

7 Claims, 24 Drawing Figures

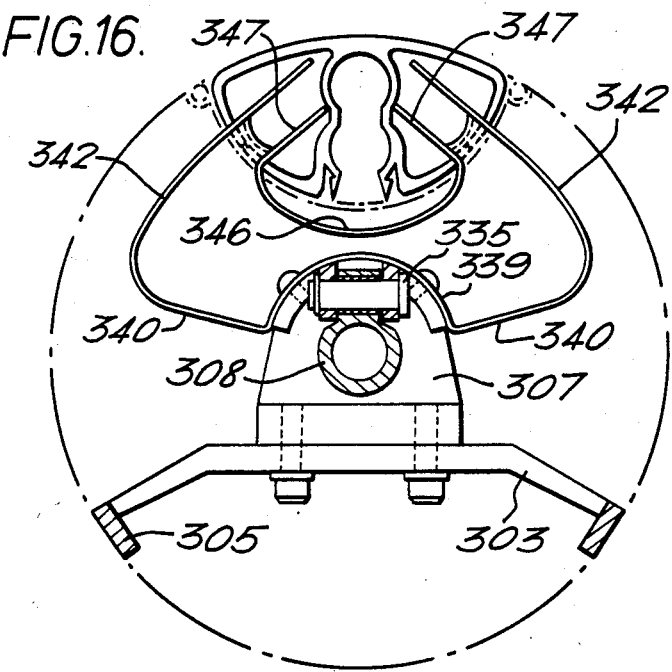
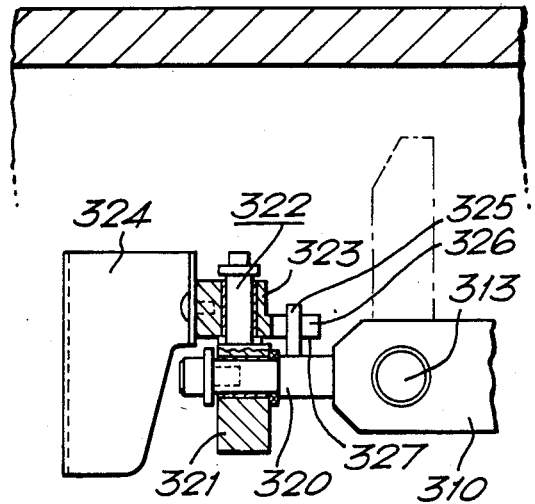

INSTALLATION OF COMMUNICATIONS CABLES

This invention relates to the running of communication cables to dwellings or other buildings. These cables may serve for the distribution of information to these buildings, for example in a cable television system, or for collecting information from those buildings, and they may be used for two-way communication. The cables themselves may be coaxial cables or fibre optic cables or a combination of such cables may be used.

For example, in the field of cable television, hitherto the practice has been to run the cables overhead to the dwellings or other buildings, by suspending them from appropriate poles in the street, or by laying them underground in trenches which are excavated for this purpose.

In accordance with this invention, for running communication cables to dwellings or other buildings to enable the distribution of information to or collection of information from those buildings, use is made of the pre-existing underground pipes which serve to drain sewage and/or surface and storm water away from those buildings.

In making use in this manner of a pre-existing system of underground pipes serving a high percentage of buildings which might require connecting directly with cables, the important advantage is achieved of avoiding unsightly overhead cables, or trench excavation on any large scale. Preferably, the cable will be secured to the inside surface of the pipes, either being secured directly to the pipe surface or contained loosely within a duct, itself secured to the pipe surface. The latter arrangement facilitates subsequent removal and replacement of the cable.

In practice, any pre-existing sewage-carrying system will typically comprise a variety of pipes of different cross-sectional shapes and sizes and different materials. For example, it may include pipes of relatively small diameter or cross-section which lead from the individual buildings, pipes of larger diameter or cross-section (the smaller pipes connecting into the sides of the larger pipes), and also the much larger tunnels which are common particularly in towns and cities and which are large enough for a man to enter and walk along.

For the latter tunnels, because of the accessibility, it is relatively straightforward to run cables through them and a number of different installation and fixing techniques are available.

For the pipes not large enough for entry of a man, in accordance with this invention the cable (or duct in which the cable is housed) is preferably secured to the pipe surface generally at the soffit (top) of the pipe so as to be relatively clear of sewage which passes in use of the pipe. The cable or its duct then causes little or no obstruction to the passage of sewage, is itself relatively immune from abrasion or dislodgement by the passing sewage and the risk is minimised of paper or other solid matter becoming attached to the cable or its duct and causing blockage. It is necessary for the cable or duct to vary its path, along its length, away from the very top (or top-dead-centre) position of the pipe, so as to pass appropriately close to side-connecting pipes through which cables must also be installed, and to avoid any pipes joining from above.

The cable (or duct in which the cable is loosely housed) may be secured to the pipe surface either at spaced intervals or substantially continuously along its length. When at spaced intervals, the fixing may be carried out by appropriate mechanical fasteners, e.g., involving screws or staples, or conveniently by clips which serve to resiliently grip the cable or duct and which are each applied by drilling a hole in the pipe wall and then pushing an interference-fitting projecting pin of the clip into the drilled hole. When substantially continuous along the length of the cable or duct, the fixing may be carried out using an appropriate adhesive, for example using an adhesive tape. Once secured to the pipe surface, the cable or duct may then be sealed to the pipe surface, for example to prevent ingress of moisture or dirt, and for example by spraying a layer of appropriate polymeric composition over the cable or duct and adjacent margins of the pipe surface. When the initial attachment is carried out using adhesive, this may serve as a temporary measure and the spraying or other sealing technique provides the permanent attachment. Conveniently, a protective cover for the cable or duct may comprise a strip of metal mesh (preferably stainless steel mesh), which is applied over the cable and may be secured for example by metal clips applied through this strip and engaging the cable or duct clips referred to above, when used.

The techniques described in the preceding paragraph depend upon one or more machines being passed through the pipe to apply the mechnical fasteners or adhesive, etc. Certain pipes in a sewer system, for example the pipes which lead from the individual buildings to make side-connections with a main pipe may be unsuited to the passage of such machines through them, by reason of bends in these side-connecting pipes, their small size, and the fact that they end at a T-junction, and by reason of economy because only a small-capacity cable or group of cables is to be installed in these side-connecting pipes. In these cases, an alternative technique is required for securing the cable (or duct in which it is loosely contained) against the pipe surface. For example, the cable or duct may be passed through the pipe, and then the pipe re-lined with a plastic tube to trap the cable or duct between the pipe surface and the plastic tube: instead the cable or duct may be secured to the plastic tube. The cable or its duct need not be disposed at the soffit (top) of the pipe but may be at any circumferential point. Re-lining of sewage-carrying pipes with a plastic tube is in itself known, for renovation of sewer pipes.

In some housing estates, there is a first system of pipes for draining sewage from the individual dwellings and passing it to a main sewer pipe which carries the sewage away from the estate, and there is a separate system of pipes for draining surface and storm water from house roofs, areas of hardstanding and roads to the main sewer pipe. This water-draining pipe system may have a seasonal influx of leaves and an occasional influx of road grit but these are normally coped with by trapping arrangements in the pipe system. Accordingly, in such housing estates, the communication cables may be run to the individual dwellings through the pipes of the water-draining system and may simply run through these pipes without fixing.

Embodiments of this invention will now be described, by way of examples only, with reference to the accompanying drawings

DESCRIPTION OF THE DRAWINGS

FIG. 16 is a section on the line XVI—XVI of FIG. 13;

FIG. 17 is a side-view of a forward deflector mechanism mounted to the forward end of the machine M3;

DETAILED DESCRIPTION OF THE PREFERRED EMBODIMENTS

Figure 1:
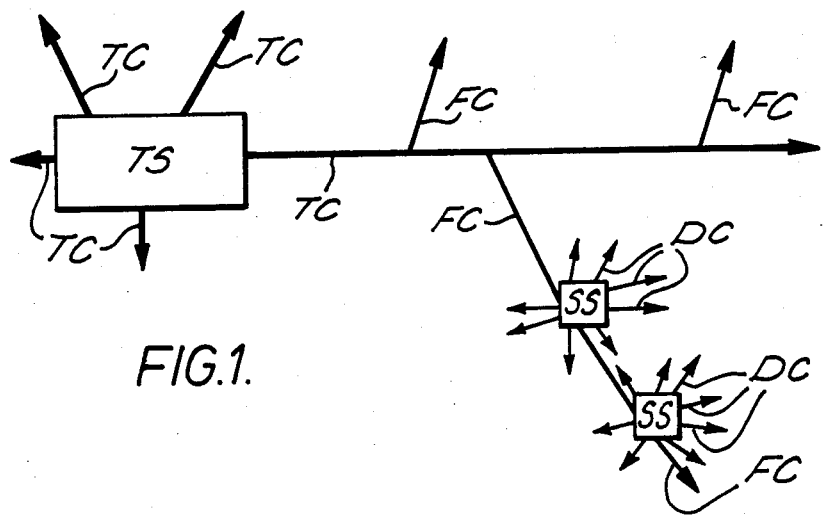
FIG. 1 is a schematic diagram of a switched-star type of cable system for cable television distribution.

For the purposes of illustrating principles of this invention, description will be given relating to a switched-star type of cable television system. The fundamental lay-out of a switched-star system is shown in FIG. 1. From a transmission station TS, a number of so-called trunk cables TC extend, each carrying a multiplicity of program channels. At appropriate points along the length of each trunk cable, so-called feeder cables FC are connected and these extend to switching substations SS which serve to switch selected program channels into so-called drop cables DC which extend to individual dwellings. The trunk and feeder cables may typically comprise high-capacity co-axial cables, and the drop cables may comprise optical fibre cables.

Figure 2:
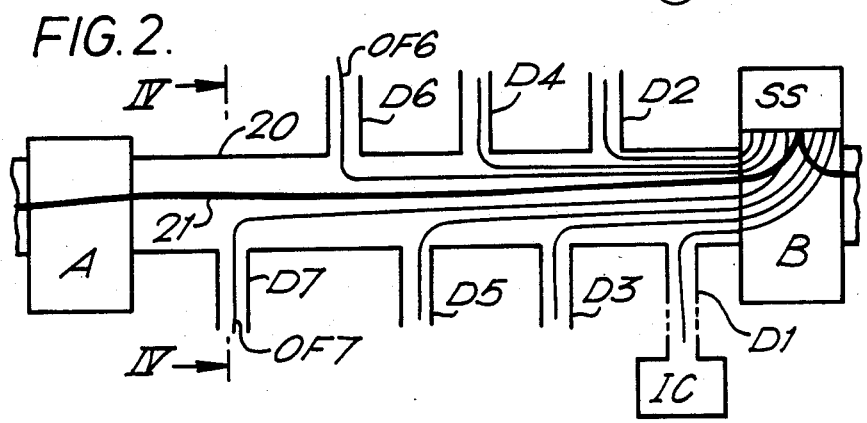
FIG. 2 is a schematic diagram to show cables installed in sewage-draining pipes according to the switched-star system, the pipes and cables shown forming small parts of the overall sewer and cable systems.

FIG. 2 shows a length of feeder cable and a number of drop cables installed in sewage-draining pipes. A section is shown of a pipe 20, accessible at A and B through respective manholes: pipes D2–D7 drain sewage from individual buildings and form side-connections into main pipe 20 at different points. For pipe D1, there is shown the typical inspection chamber IC adjacent the building served, and to which the drop cable is to extend for connection into the building. A feeder cable 21, in the form of a multi-mode coaxial cable of 22 mm diameter, is installed straight along the main pipe 20 to a switching substation SS mounted above ground at location B. From this switching substation, optical fibre drop cables are installed along the main pipe 20 and up the respective side-connecting pipes D1–D7 to the individual buildings, providing to the individual buildings selected ones of the program channels of the feeder cable, under the control of the switching substation. FIG. 2 is a diagrammatic in that in practice the feeder cable 21 will vary its path to lie appropriately close to the junction of each of pipes D1–D7 with the main pipe 20.

Figure 3:
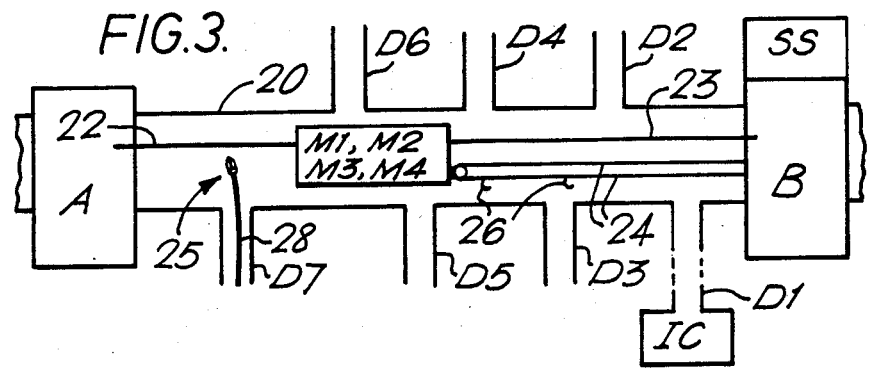
FIG. 3 is a schematic diagram for explaining a sequence of procedures for installing the cables shown in FIG. 2.

There will now be described an example of a procedure for installing the cables according to a system as illustrated in FIG. 2, reference being made to FIG. 3. Firstly, a transporting line 22 is threaded through main pipe 20 from A to B. Then at B, a machine M1 is disposed in the main pipe 20 and hooked up to the transporting line 22 and this machine M1 is then pulled through the pipe 20 to A, pulling behind it a second transporting line 23 and also the feeder cable 21: at intervals along the pipe 20, machine M1 drills holes in the soffit of the pipe and pushes into each of these holes a clip for securing the feeder cable 20. Machine M1 incorporates a closed circuit television camera for the operating personnel to observe the positions at which the pipes D1–D7 join the pipe 20, so that these personnel may control machine M1 so as to determine the required path along which the cable 20 must be secured to pass adjacent these side-connections. Thus the machine M1 is controlled to fix each clip at a desired circumferential point of the main pipe 20 and also at a desired axial position relative to side-connecting pipes D1–D7 in the case of clips immediately adjacent such pipes.

Next, at A, a machine M2 is disposed in the main pipe 20 in place of machine M1, and is hooked up to the second transporting line 23 at its front and the first transporting line 22 at its rear. The second transporting line 23 is then used to pull machine M2 through the main pipe 20 to B: machine M2 serves to form the feeder cable 21 to a profile appropriate to its required path along the pipe 20 which is now defined by the installed cable clips. Machine M2 incorporates a closed-circuit television camera for the operating personnel to observe the positions of the cable clips and then to control the machine according to the profile to which the feeder cable must be formed over successive portions of its length. This "forming" of the feeder cable 20, prior to engaging it with its cable clips, is particularly advantageous when the feeder cable is a large diameter, metal sheath coaxial cable in view of its inherent stiffness. Machine M2 serves to displace each pre-formed length of cable into engagement with the installed clips, before being advanced to form the next length of cable.

Now at B, the first transporting line 22 is hooked up to the second transporting line 23 and also to one or more drag lines, one of which is shown at 24, so that each drag line will pass through the main pipe 20 from B to A and return to B. Now at A, a machine M3 is disposed in the pipe 20, and hooked up to transporting line 23: also each drag line 24 is looped around a pulley wheel of the machine M3. Next the machine M3 is pulled through the pipe 20 from A towards B.

Figure 4:
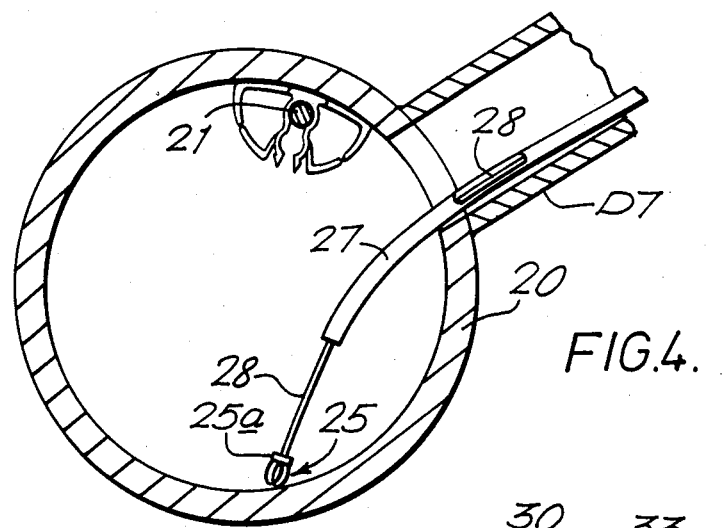
FIG. 4 is a cross-section through a main sewer pipe shown in FIG. 2 and on the line IV—IV thereof, showing cable arrangements at the junction of a side-connecting pipe with the main sewer pipe.

Referring to FIG. 4, before the machine M3 reaches the first side-connecting pipe D7, a flexible metal duct 27 is passed down the pipe D7 (from the inspection chamber adjacent the building which that pipe serves) so that a predetermined length of the metal duct projects into the main pipe 20. Within the duct 27 lies an elongate flexible element 28 carrying a hooking arrangement 25 at its end, which hooking arrangement projects as shown down to the floor of pipe 20. This flexible element may be the drop cable, or it may be a draw line intended to be pulled through the metal duct and draw behind it the required drop cable. The hooking arrangement 25 comprises a head 25a from which a series of elongated wire loops project, the loops being disposed in successive planes intersecting on the longitudinal axis of the arrangement 25, which accordingly is similar to a common egg whisk. When the leading end of the machine M3 arrives at pipe D7, arrangement 25 is caught into a predetermined position of the machine adjacent the drag line 24: the drag line is provided with hooks e.g. 26 at intervals so that when one of its ends is pulled at B, pulling the drag line around its pulley on machine M3, then one of the hooks 26 engages the hooking arrangement 25. Continued pulling of the drag line then serves to draw the elongate flexible element 28 through pipe D7 and along main pipe 20 to B, where it can be disengaged from the drag line.

Then the machine M3 is pulled through the pipe 20 to the next pipe D6, at which the same procedure is employed for catching the elongate flexible element now installed, within its metal duct, in pipe D6, and for drawing it through to B. As machine M3 is pulled from pipe D7 to pipe D6, its trailing end serves to engage the elongate flexible element 27 (from pipe D7) with the cable clips: it also serves to engage the projecting length of metal duct from pipe D7 with the first clip beyond pipe D7. Similarly, as the machine M3 is subsequently pulled from pipe D6 to pipe D5, its trailing end serves to engage with the clips (over that distance) the elongate flexible elements from both pipes D7 and D6. This procedure is repeated for all pipes D7–D1 until the machine M3 reaches B, having been used to draw elongate flexible elements, from all pipes D7–D1, through to B and to engage them with the successive cable clips. In passing through the pipe 20, machine M3 also draws behind it a strip of stainless steel mesh, preferably housing within an elongate plastic bag.

Finally, a machine M4 is disposed in the pipe 20 at B and attached to transporting line 22 and pulled through to A, this machine serving progressively to strip back the plastic bag from the strip of stainless steel mesh and apply the latter over the feeder cable 20 and drop cables, and to secure this strip in position by applying metal clips through the strip to engage the respective cable clips.

Where each element 28 is a draw line intended to draw the drop cable through the respective side-connecting pipe and then through the main pipe 20 to the switching substation B, this drawing step may be carried out on each draw line before machine M3 is advanced to the next side-connecting pipe, or it may be left until machine M3 has arrived at B having engaged all such draw lines with the cable clips, or even until after machine M4 has applied the mesh cover.

Figure 5:
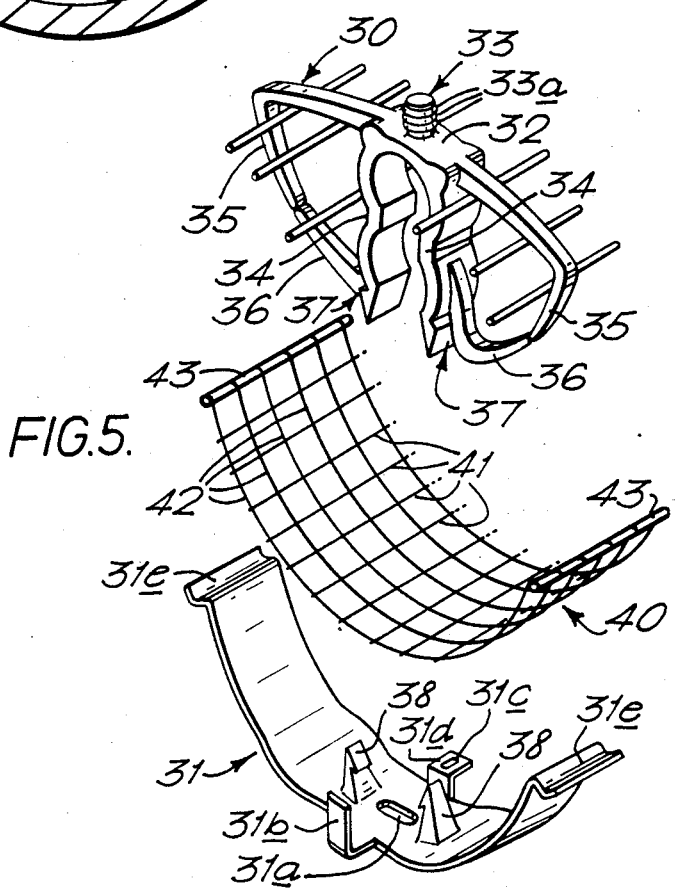
FIG. 5 is an isometric view of a plastic clip for securing cables to the soffit of a pipe, a portion of a metal mesh strip for covering the clips and cables, and of a metal clip for co-operating with the plastic clip to secure the strip in place.
Figure 6:
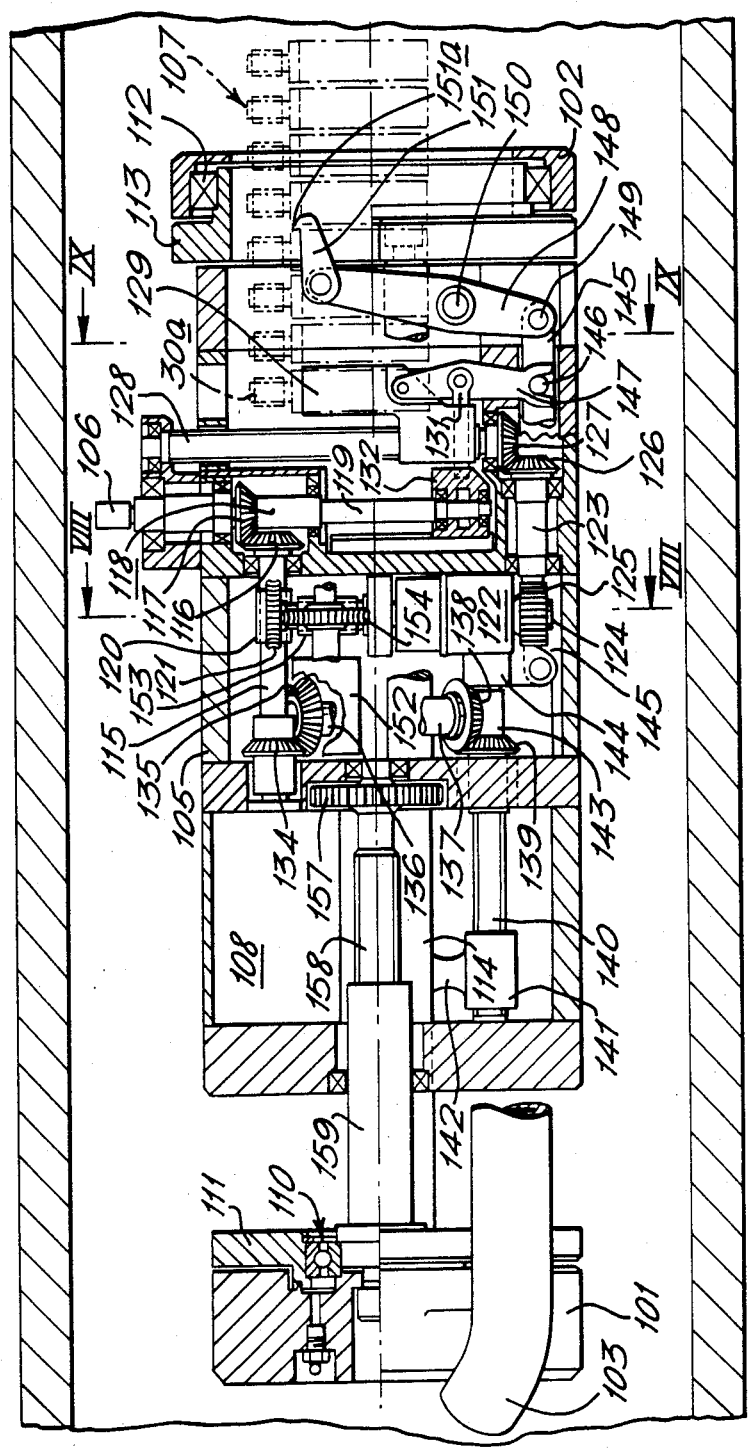
FIG. 6 is a side view, part-sectional, of a machine M1 for passing through a pipe and at intervals drilling holes in the pipe and push-fitting clips into those holes.
Figure 7:
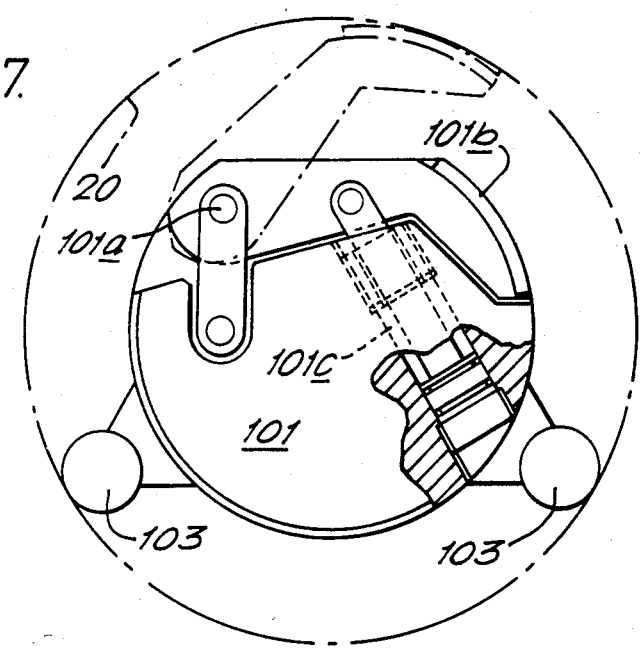
FIG. 7 is a front end-view of the machine M1.
Figure 8:
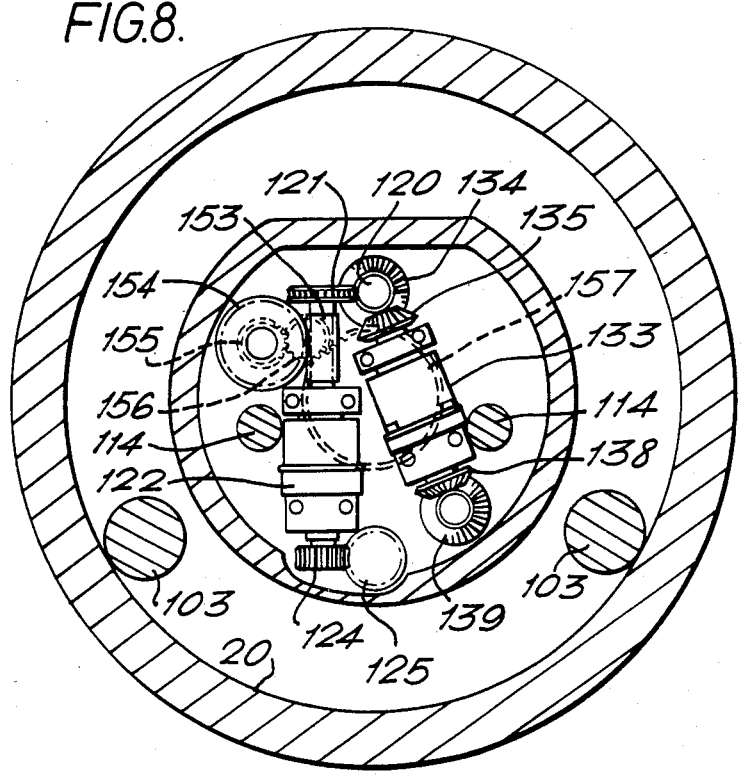
FIG. 8 is a cross-section of machine M1 on the line VIII—VIII of FIG. 6.

FIG. 5 shows one of the clips 30 for the feeder cable and a metal clip 31 for securing the metal mesh, a section of which is shown at 40. The clip 30 is a one-piece injection moulding of plastics and has a base 32 from which a pin 33 projects for forming an interference fit in a hole drilled in the pipe wall: pin 33 is formed with annular ribs 33a to said securement. From the underside of base 32, two legs 34,34 depend, defining between them two circular recesses (one above the other) for receiving respective feeder cables 21, the legs 34,34 serving to resiliently embrace and retain such cables. To the outside of each leg 34, there is a large compartment for receiving a plurality of the drop cables each such compartment being closed by a pair of opposed fingers 35,36, one projecting first outwardly from the base 32 and then downwardly and inwardly and the other projecting upwardly and outwardly from the lower end of leg 34. The base 32 and the outwardly projecting portions of the two fingers 35 form a curved profile corresponding to the surface of the pipe which the clip is to seat against. The fingers 36 and the other portions of fingers 35 impart a smooth, convex lower surface to the clip and the bottom ends of the legs 34 are formed with recesses 37 for engaging toothed projections 38 of the metal cover clip 31. This metal clip 31 is curved generally to the convex profile of the lower surface of the clip 30 and the projections 38 project from its concave upper side: projections 38 are a snap-fit into the recesses 37 of the clip 30. The base of clip 31 is formed with an aperture 31a, and to one side the clip is formed with an upturned tab 31b and to its other side with an aperture 31c in a raised, projecting tab 31d: the purposes of these features will be explained in connection with the operation of machine M4.

The metal mesh strip 40 is formed of stainless steel wires 41,42 woven together as a mesh as shown and being sufficiently fine in diamater that the strip 40 exhibits considerable flexibility and ability to deform in shear, in order to follow a complex path of the feeder cable. Along each side of the strip 40, reinforcing wires 43 are provided and may be secured in position by rolling edge margins of the woven mesh around them and fixing these margins. The metal clip 31 is formed with recessed ears 31e for accommodating the wires 43 of the strip 40.

FIGS. 6–9 show the machine M1 for drilling the holes in the pipe wall and push-fitting the clips 30. Machine M1 has a chassis comprising a front body 101 and a rear ring member 102 mounted to a pair of parallel, spaced skids 103 running lengthwise of the machine and serving for resting and sliding the machine on the pipe bottom. The front body has pivoted thereto at 101a a clamp 101b which may be swung into engagement with the surface of pipe 20 by a linear actuator 101c acting between body 101 and the pivotal clamp. Once the machine has been pulled through the pipe 20 to its required axial position the clamp is applied.

Journalled by a bearing 110 to the body 101 is a ring 111, and journalled by a bearing 112 to the rear ring member 102 is a ring 113. Two transversely-spaced slide rods 114,114 are secured at their opposite ends to the rings 111 and 113. A body 105 of the machine is slidable along the slide rods 114,114 and the body 105 is rotatable about the axis of the machine by turning the assembly of rings 111 and 113 and rods 114,114 on the bearings 110,112. The body 105 carries a drill 106, with a diamond impregnated head, and an arrangement for receiving a clip 30 (from a bandolier 107 of such clips connected together by adhesive for example) and for pushing the pin 33 of this clip into the drilled hole.

The machine body 105 mounts an hydraulic motor 108 which is permanently coupled to the drill through a transmission consisting of a motor output shaft 115 carrying a bevel gear 116 meshing with a bevel gear 117 driving a sleeve 118 encircling the drill shank 119 and having a longitudinal spline coupling therewith. A worm gear 120 on motor output shaft 115 meshes with a worm wheel 121 to drive an input shaft to an electrically-controlled clutch 122: when this clutch is engaged, its output shaft drives a transmission shaft 123 via meshing gears 124,125. A bevel gear 126 at the rear end of shaft 123 meshes with a bevel gear 127 to rotate a vertical lead screw 128 which is engaged with a clip elevator 129, slidably guided by two spaced rods 130,130. A pair of linking pins 131,131, at this time extend, through bores in elevator 129, into respective blind bores as shown in a bearing block 132 of the drill shank. Thus rotation of the lead screw 128, in the event of clutch 122 being engaged, serves to advance the drill for drilling into the pipe wall. When the hole is drilled, the motor is reversed to withdraw the drill and return the clip elevator to its lowered position: clutch 122 is then disengaged.

Then the body 105 of the machine must be indexed forward to place the leading clip 30 of the bandolier 107 on the clip elevator (which elevator has been empty during drilling) and to align the clip elevator (and its clip) with the drilled hole. An electrically controlled clutch 133 is engaged to transmit drive (received via a bevel gear 134 meshing with a bevel gear 135 on the clutch input shaft 136) to its output shaft 137, which via meshing bevel gears 138,139 drives a lead screw 140 engaged with a nut 141 fixed by a bracket 142 to one of the slide rods 114. This produces the required forward movement of the body 105.

Figure 9:
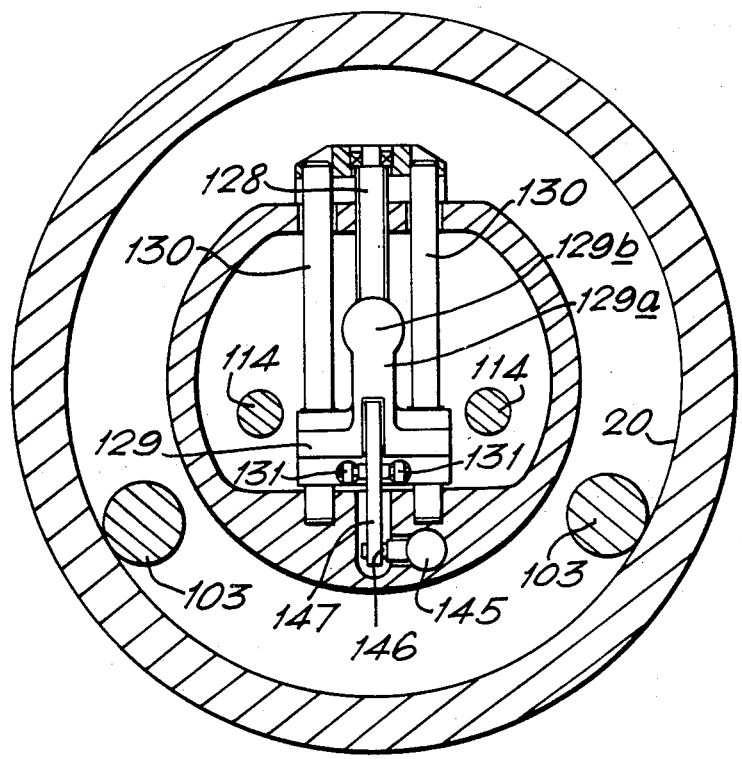
FIG. 9 is a cross-section of machine M1 on the line IX—IX of FIG. 6.

At the same time, another lead screw 143, on the same shaft as lead screw 140 but of different pitch, is also driven and an element 144 with which it is engaged produces a small rearwards displacement of an actuator rod 145. A pin 146 of the actuator rod is coupled with a lever 147 which is pivoted at its other end to the clip elevator, and to which rear ends of the linking pins 131,131 are coupled. Thus the rearward movement of actuator rod 145 moves the pins 131,131 rearwardly to disengage their free ends from the bearing block 132. Also, the rearward movement of actuator rod 145 pivots a lever 148 (to which the rod 145 is coupled at 149) about its fixed pivot point 150, and a pawl 151 at the upper end of lever 148 serves to pull forward the bandolier 107 so that the leading clip 30 will be pushed into the position 30a (i.e. on the elevator). FIG. 9 shows the end view of the elevator and shows an upwards projection 129a thereof for engaging between the legs of the clip and with a bulbous head 129b for engaging in the inner of the two recesses of the clip. The clip becomes a slightly frictional fit on the elevator projection 129a at this stage.

When the combined forward movement of the body 105, and rearward movement of the actuator rod 145, are complete, clutch 133 is disengaged. The clip elevator 129 has now been indexed forward to align its clip with the pre-drilled hole.

Next, clutch 122 is engaged with the effect, as before, that the lead screw 128 is driven and the clip elevator is driven upwards: however, the linking pins 131,131 are disengaged from the drill bearing block 132 and the drill is therefore not advanced (although it continues to rotate). The clip elevator now serves to push its clip into the pre-drilled hole where it becomes secured as an interference fit. The motor 108 is now reversed so that the elevator is lowered, and in so doing it pulls itself free from the installed clip. Clutch 122 is disengaged when the elevator is in its lowered position. Further, clutch 133 must now be reengaged and the motor driven in reverse to displace the body 105 rearwardly to its original position, and to displace the actuator rod forwardly to its original position, before the machine is ready to drill the next hole and install the next clip after the machine is advanced, as a whole, along the pipe 20. In this return movement of the actuator rod, pawl 151 slides on the underside of the base of the next clip (being depressed against the bias of a spring acting around its pivot to lever 148) until its nose hook 151a engages behind that next clip.

Prior to drilling the hole, once the machine has been moved to the required axial position within the pipe 20, the body 105 must be rotated to the required angle so that the hole will be drilled at the required circumferential point. This is effected by engaging a clutch 152: drive is taken from a worm gear 153 (on the input shaft to clutch 122) to a meshing worm wheel 154, through clutch 152 to a gear train 155,156, of which gear 156 meshes with a gear 157. This gear 157 is fixed to a shaft 158 coupled by a longitudinal spline with a sleeve 159 secured to front body 101 of the machine. The effect of this drive is that the body 105 rotates around the shaft 158, which is itself fixed against rotation by the spline connection to fixed sleeve 159. The spline connection permits the longitudinal movement of the body relative to the machine chassis for the indexing purpose.

Figure 10:
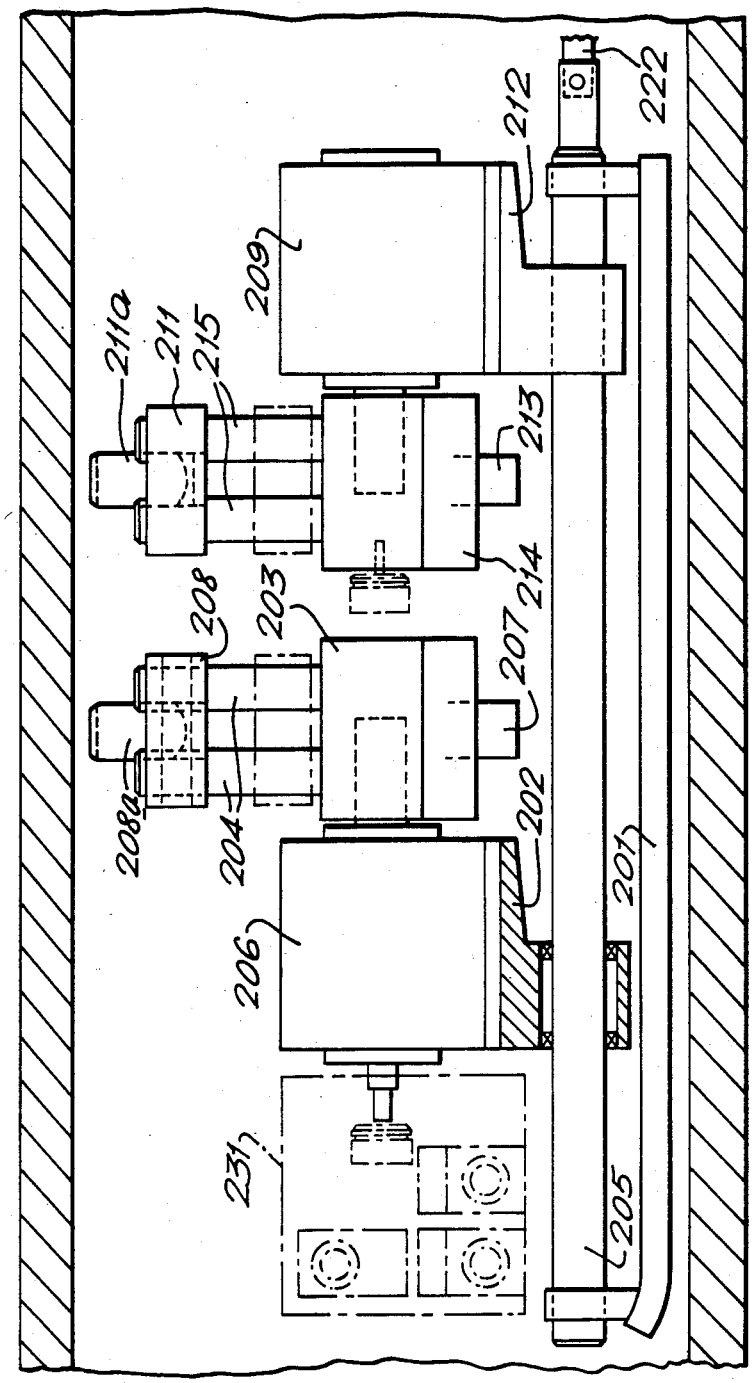
FIG. 10 is a side-view of a machine M2 for passing through a pipe and capable of "forming" a cable to a required path, then applying the cable to clips already installed by machine M1.
Figure 11:
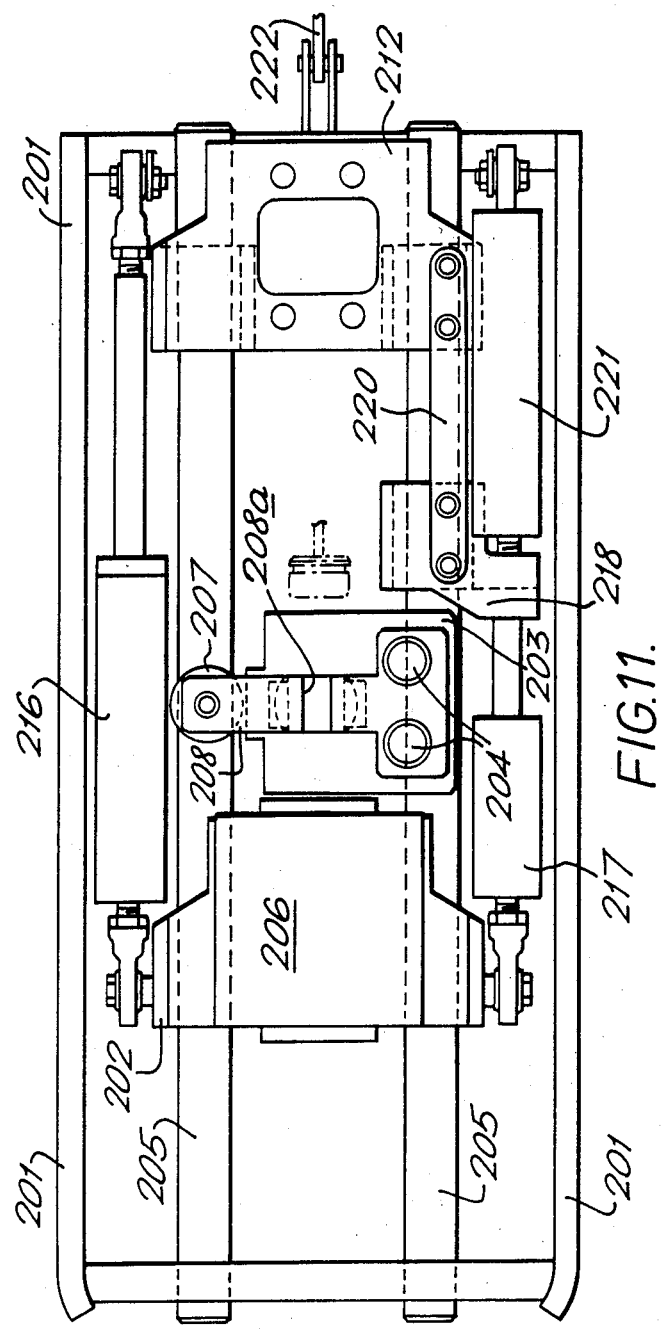
FIG. 11 is a plan view of the machine M2.
Figure 12:
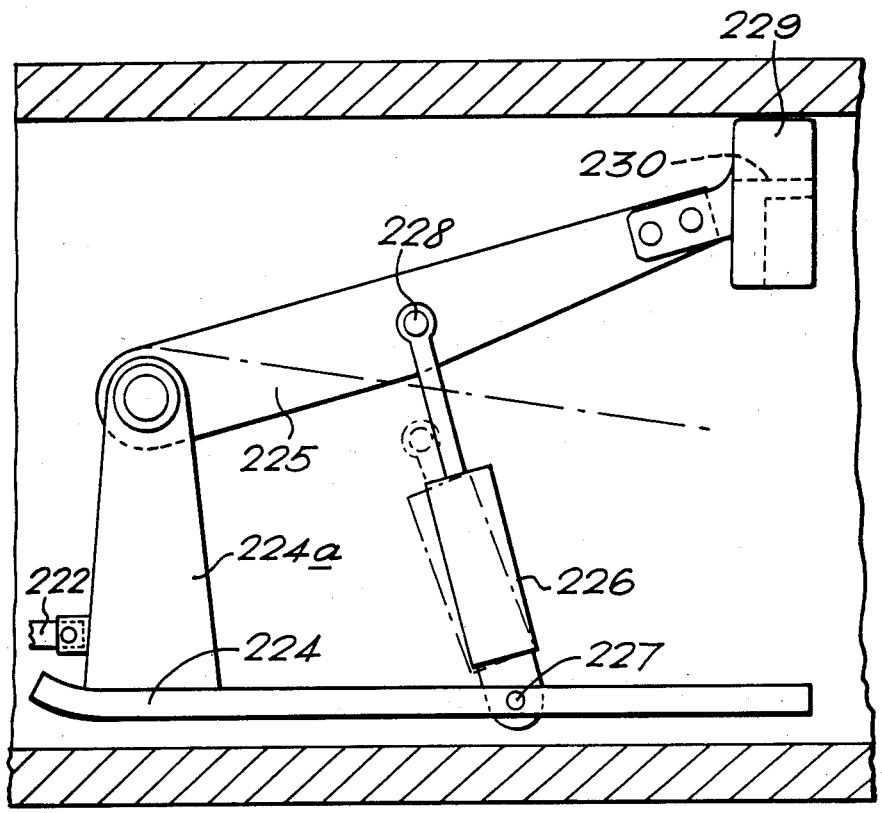
FIG. 12 is a side-view of a trailer assembly for connection by an articulating link to the machine of FIGS. 10 and 11, and serving to hold the cable firmly in position at a point rearwardly of that machine as it carries out its forming operation.

FIGS. 10 to 12 show the machine M2 for forming the metal-sheathed co-axial cable 21 to its required path and then applying that cable to the clips which machine M1 has installed. The machine comprises two parallel, spaced skids 201 (one shown) to which two parallel slide bars 205 are mounted. Towards the front end of the machine, a first rotary actuator 206 is mounted on a carriage 202 which is slidable along the bars 205. The output shaft of actuator 206 carries a support 203 for a piston and cylinder actuator 207 and is provided with guide bores for two slide rods 204, 204. A cross-piece 208 is mounted on the upper ends of the rods 204 and the linear actuator 207 and is provided with an eye 208a for engaging the feeder cable 21. Facing this assembly 202–208 is a similar assembly of a second rotary actuator 209 on its slidable carriage 212, a second linear actuator 213 on its support 214 and a second cross-piece 211 with its eye 211a, mounted on slide rods 215,215.

Referring to FIG. 11, there are shown three piston and cylinder actuators for controlling movement of the two rotary actuator assemblies along their slide bars 205. A first actuator 216 acts between the carriage 202 of the forward rotary actuator and the rear end of the machine chassis. A second actuator 217 acts between the carriage 202 of the forward rotary actuator and a bracket 218 which is secured to the forward end of a tie rod 220 projecting forwardly from the carriage 212 of the trailing rotary actuator. A third actuator 221 acts between the bracket 218 and the rear end of the machine chassis.

Machine M2 further comprises a trailer assembly (FIG. 12) which is, in use, to be hitched to the rear of machine M2 by an articulating link 222. The trailer assembly comprises a chassis mounted on a pair of parallel skids 224 (one shown). At the front end of this chassis, an upwardly projecting support 224a is provided for the pivot point of a trailing arm 225. A piston and cylinder actuator 226 acts between a pivot point 227 at the rear end of the trailer chassis, and a pivot point 228 at an intermediate point along the trailing arm 225. At the end of the trailing arm 225, there is mounted a member 229 having a recess 230 for engaging a length of the feeder cable 21 which has already been formed to its required profile. The member 229 is arcuate in shape to follow the curved surface of the pipe 20 and may be formed with one or a series of discrete recesses 230 for engaging the feeder cable 21, or with one elongate recess.

In use of the machine M2, the feeder cable 21 is engaged with the eyes 208a, 211a as the machine is assembled in the sewer pipe 20. The machine is to progress from right to left as viewed in FIGS. 10 to 12, with the eyes 208a, 211a continuing to engage the cable as they slide along it. The eyes may be lowered (by their respective linear actuators 207,213) when required to avoid obstruction (e.g. installed cable clips), and can be set to any desired relative radii, longitudinal spacings and angular positions for "forming" the feeder cable. This forming is effected primarily by rotating the two eyes one relative to the other (by their respective rotary actuators) and either or both of these eyes can be thus rotated at the same time: however either or both eyes may be moved longitudinally whilst the relative rotation takes place, and also either or both eyes may be moved radially at the same time.

In the following sequence (given by way of example) of operation of machine M2, the forming step is carried out with the trailing eye 211a kept stationary whilst the forward eye 208a is rotated and at the same time displaced forwardly. The machine is pulled through the sewer pipe 20 until the first of the already installed clips are reached. The trailing arm 225 is then lifted to engage the cable 21 and hold it firmly in place against the soffit of the pipe 20, and the hydraulic feed to the rotary and linear actuators is controlled to effect the following sequence. Firstly, linear actuator 221 and rotary actuator 209 are locked to maintain the trailing eye 211a stationary against lengthwise and rotary movement. Secondly, linear actuator 217 is extended a short increment whilst rotary actuator 206 is rotated in the appropriate direction. Thirdly, linear actuator 221 is released and linear actuator 216 is locked: this releases the trailing carriage assembly for lengthwise movement and locks the forward assembly against movement. Fourthly then, linear actuator 217 is contracted whilst trailing rotary actuator 209 is allowed to freewheel, advancing the trailing carriage assembly up to the forward assembly. Then linear actuator 216 is released. This entire sequence is then repeated several times (perhaps 10 cycles altogether) until the forward carriage assembly has moved as far forward as the length of the slide bars 205 will allow. Then the entire machine must be pulled or winched forward, whilst returning the two carriage assemblies to their rearward positions, to enable the machine to "form" the succeeding length of the cable 21 if required.

For applying a formed length of cable to a clip already installed by machine M1, the sequence typically may be as follows. Linear actuators 207 and 213 are contracted so that eyes 208a and 211a will clear the clip and then the machine M2 is winched along the pipe 20 until both eyes 208a and 211a have passed the clip. Then linear actuactors 207 and 213 are extended to displace the cable towards and into snap-engagement with the clip. The machine M2 may now be winched forward to the next clip where a forming operation will be required on the cable: the trailing arm 225 must be lowered for it to clear the clip into which the cable has just been snap-engaged.

Machine M2 incorporates a closed circuit television for observation and control purposes. All actuators are hydraulically powered, and control solenoids for the actuators may be mounted in a housing 231 itself mounted to the forward carriage (at its forward end). Rotary encoders 232, 233 are provided on the shafts of the rotary actuators, to generate electrical signals representing the rotational positions of the respective eyes 208a, 211a. Leads for hydraulic power and electrical control extend from ground level and connect with the machine at its front end.

Figure 13:
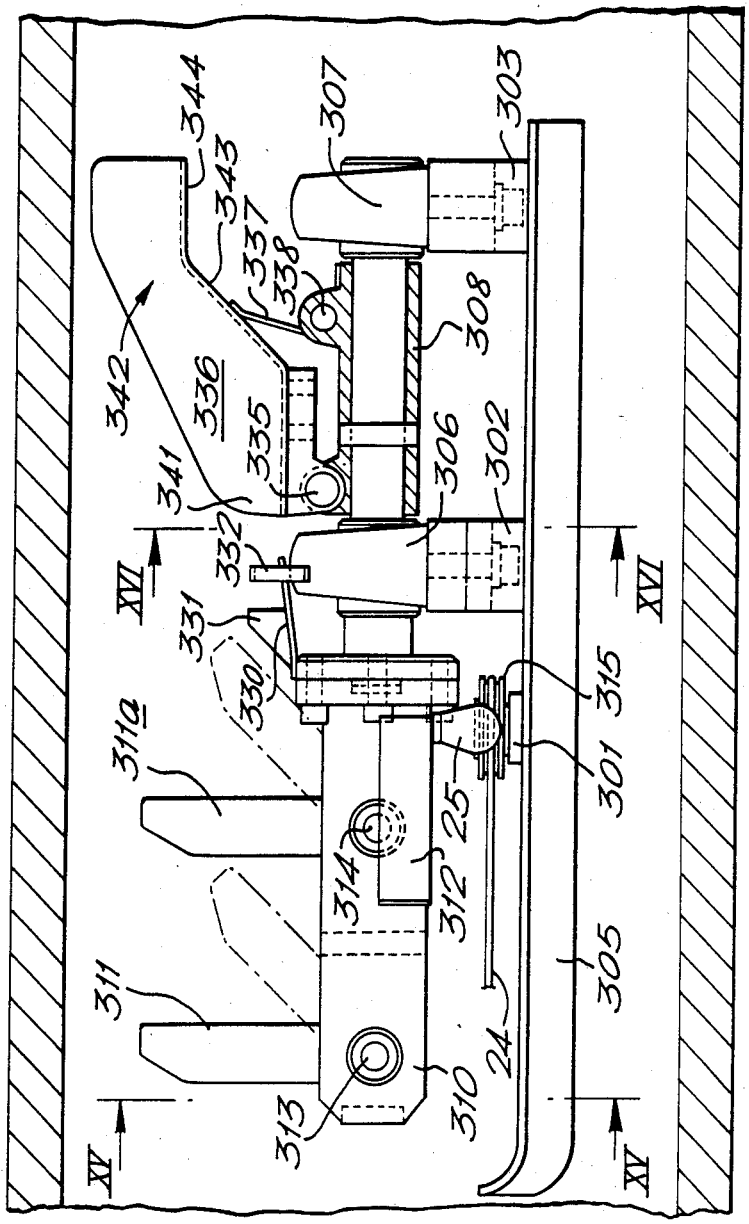
FIG. 13 is a side-view of a machine M3 for passing through a pipe, collecting elongate elements projecting into that pipe from side-connecting pipes, and engaging those elements with clips already installed at intervals along the main pipe.
Figure 14:
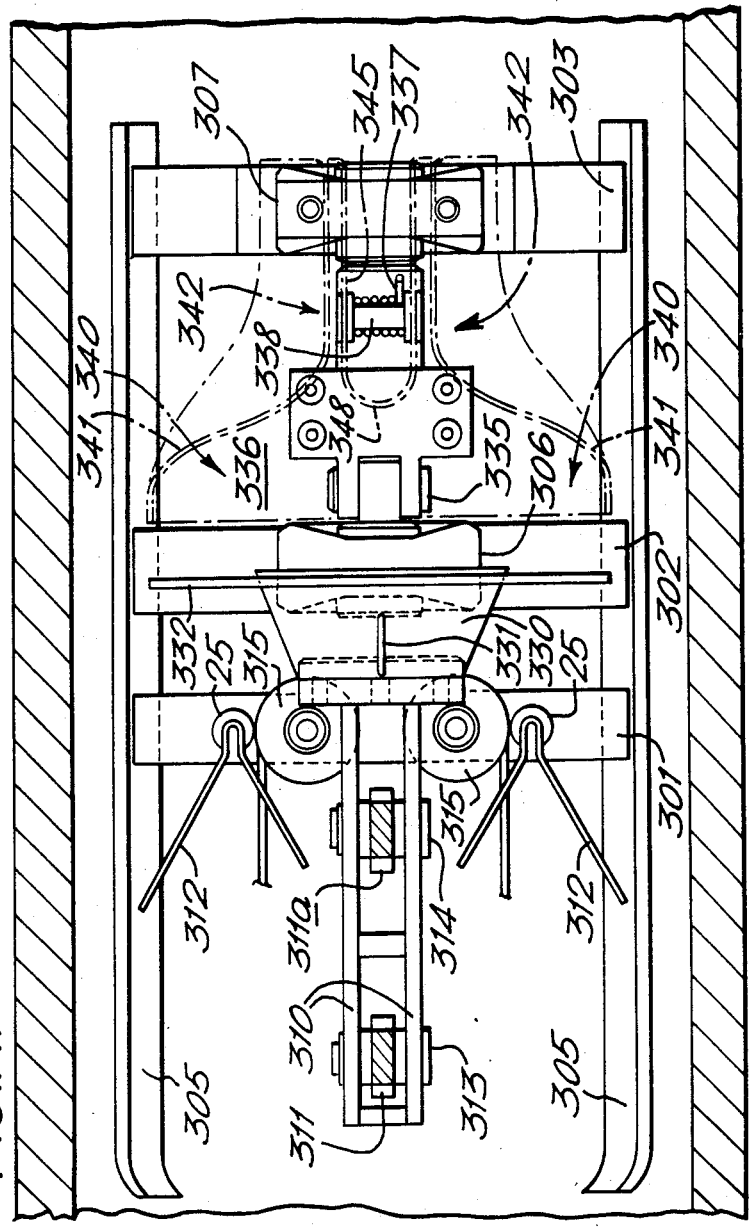
FIG. 14 is a plan view of the machine M3 of FIG. 13.

FIGS. 13–17 show the machine M3, again intended to move from right to left as viewed in FIGS. 13 and 14. The machine comprises a chassis consisting of 3 bridge members 301, 302, 303 secured across a pair of parallel skids 305. Bridge members 302 and 303 mount respective bearing blocks 306,307 for journalling a lengthwise shaft 308 which carries certain operational parts of the machine. At its forward end, the shaft mounts two parallel, elongate plate extensions 310, 310 between which a pair of upwardly projecting arms 311, 311a are pivoted at lengthwise-spaced points 313, 314. These arms 311, 311a are sprung towards their upright positions and are forked at their upper ends (see FIG. 15) so as to engage the already-installed feeder cable 21 at lengthwise-spaced points. In pulling the machine M3 along the pipe 20, the arms 311,311a accordingly follow the feeder cable in its varying position on the pipe circumference, causing shaft 308, and the operational parts of the machine which it carries, to rotate accordingly. Should either of the arms meet an obstruction (in particular one of the clips installed by machine M1), it is free to be deflected downwards against its spring bias.

The forward bridge member 301 mounts two pulleys 315, 315 one to each side, around which the drag lines 24 run, and also two catching guides 312, 312, one to each side. Each of these guides serves to engage the hooking arrangement 25 at the end of the elongate flexible element which projects into the main pipe 20 from a side-connecting pipe, and for guiding this arrangement 25 to the rest position shown, in the orientation shown, upon forward movement of the machine M3. The rest position, for each catching guide 312, is adjacent the respective pulley 315, so that if the machine is stopped and the corresponding drag line 24 is pulled at this time, one of its hooks will pick up the hooking arrangement 25 as previously described. As shown, each guide 312 comprises an elongate metal strip bent to a V shape, with one limb slightly longer than the other and the apex extended into a parallel-sided channel. The strip thus formed is mounted with the plane of its V horizontal, the apex of the V rearward of the machine and its longer limb towards the outside of the machine. The hooking arrangement 25 is to be guided into the rest position shown, in which rest position the hooking arrangement 25 has its head in contact with the lower edge of the guide at the floor of the channel at the apex of the guide. It will be seen from FIGS. 13, 14 and 15 that this places the hooking arrangement with its lower end portion level with and immediately adjacent the respective pulley 315. In operation, as the machine M3 is pulled through the pipe 20, the appropriate one of guides 312, 312 will encounter the elongate flexible element which projects into the pipe 20 from a side-connecting pipe: the guide concerned will be on the same side of the machine as the side-connecting pipe joins the main pipe 20, and at this time the elongate flexible element will extend beyond the end of its metal duct for its hooking arrangement to lie on the floor of the pipe 20. Once the elongate flexible element is encountered by the guide 312, it will be guided into the channeled apex of the latter and tension in the elongate flexible element will cause the hooking arrangement to come to the rest position shown.

A forward deflector mechanism (FIG. 17) is mounted to the forward end of the extensions 310 and acts to deflect the elongate flexible element into the appropriate one of the two guides 312, 312. The mechanism comprises an axial shaft 320 on which is journalled a weighted gimble 321 having an upwardly projecting shaft 322. A mounting block 323 is journalled on shaft 322 and mounts a forwardly-projecting deflector plate 324. The shaft 320 has an upstanding pin 325 engaging within a slot 326 formed in a rear extension 327 of the mounting block 323, which slot 326 is elongated in the transverse direction.

Suppose a side-connecting pipe joins with the main pipe 20 from the reader's side of the paper, when viewing FIG. 17. The path of the feeder cable will, in this region, have departed from the top-dead-centre of the pipe 20 and towards the side-connecting pipe (i.e. up out of the plane of the paper). Thus the main shaft 308 of machine M3 will have been rotated (and with it the extension 310 and shaft 320) so as to incline pin 325 up out of the plane of the paper. The weight of gimble 321 will however maintain shaft 322 vertical: accordingly, pin 325 will strike rear end of slot 326 and cause the deflector plate 324 to turn into the paper. Deflector plate 324 thus partially closes that side of the main pipe 20 which is remote from the side at which the side-connecting pipe joins it. Thus any tendency for the flexible elongate element, projecting into the main pipe from the side connecting pipe, to stray into the far guide 312 (instead of the near guide) is inhibited.

Figure 15:
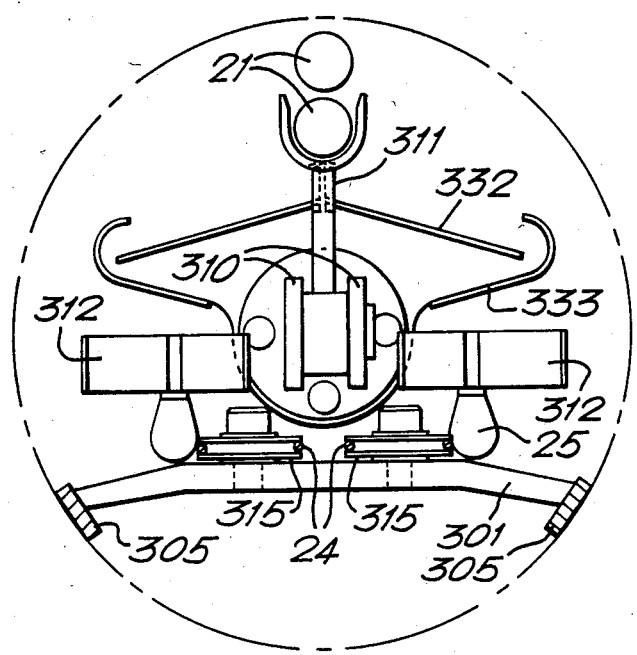
FIG. 15 is a section on the line XV—XV of FIG. 13.
Figure 18:
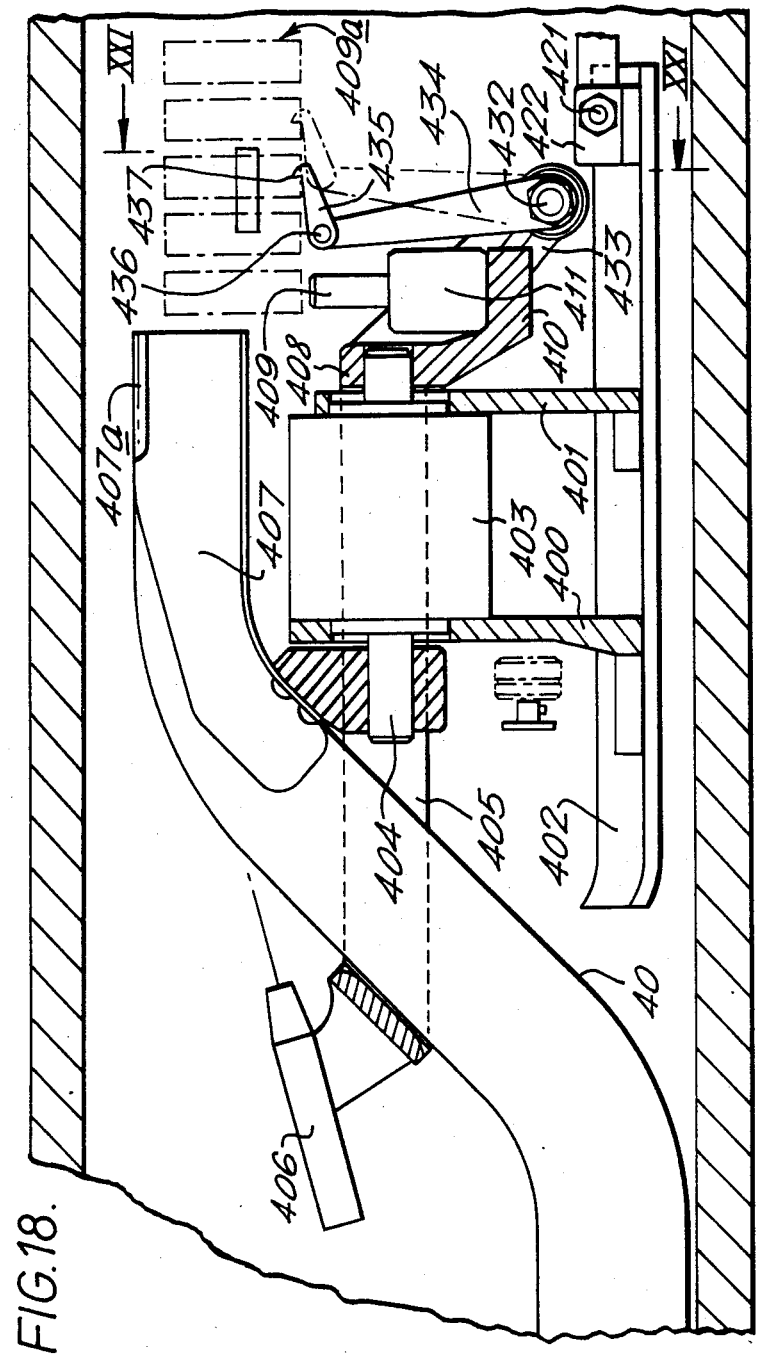
FIG. 18 is a side view of a machine M4 for applying a metal mesh strip over installed cables and their clips and for inserting metal clips to secure this strip in position.
Figure 19:
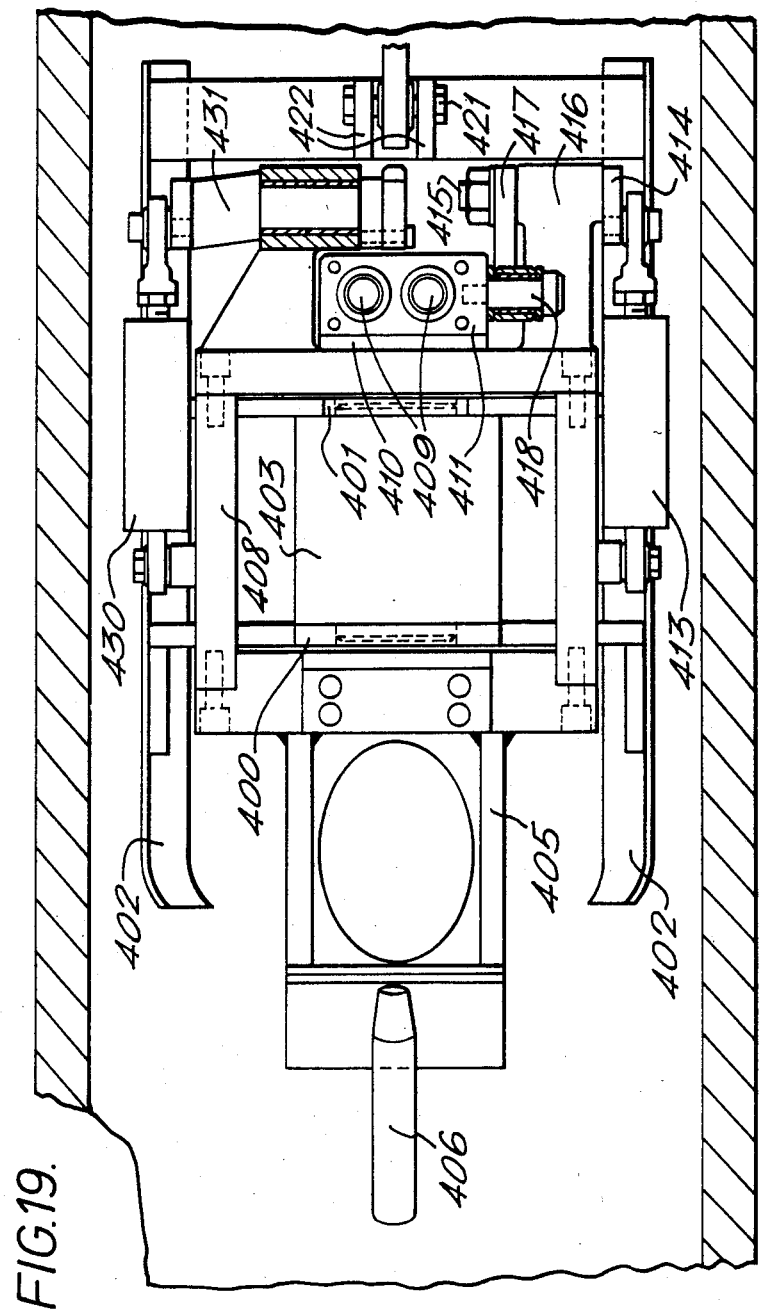
FIG. 19 is a plan view of the machine M4, omitting its guide duct and clip cradle.
Figure 20:
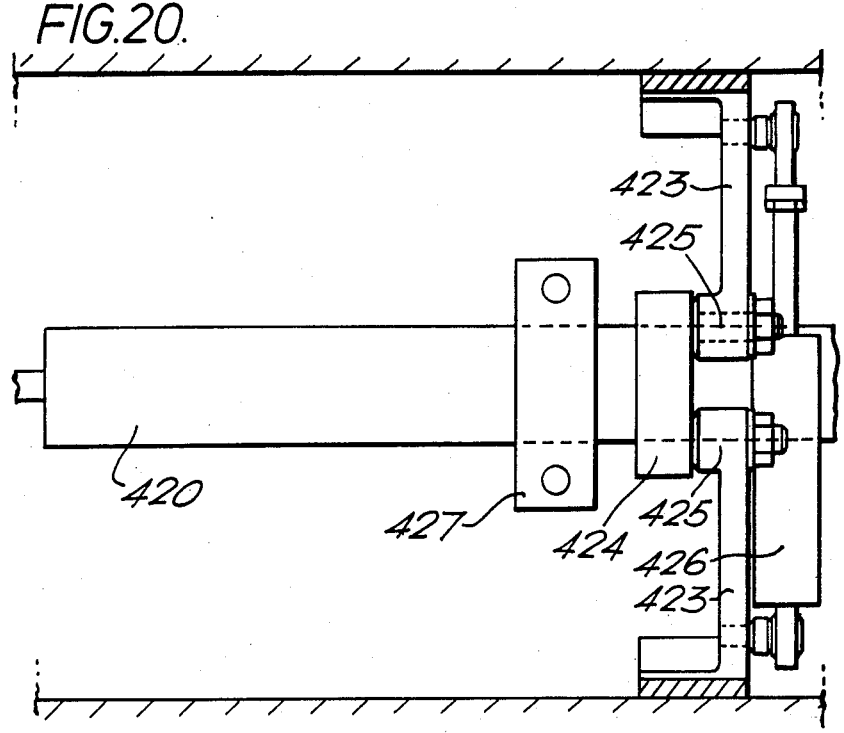
FIG. 20 is a plan view of a trailer of the machine M4.
Figure 21:
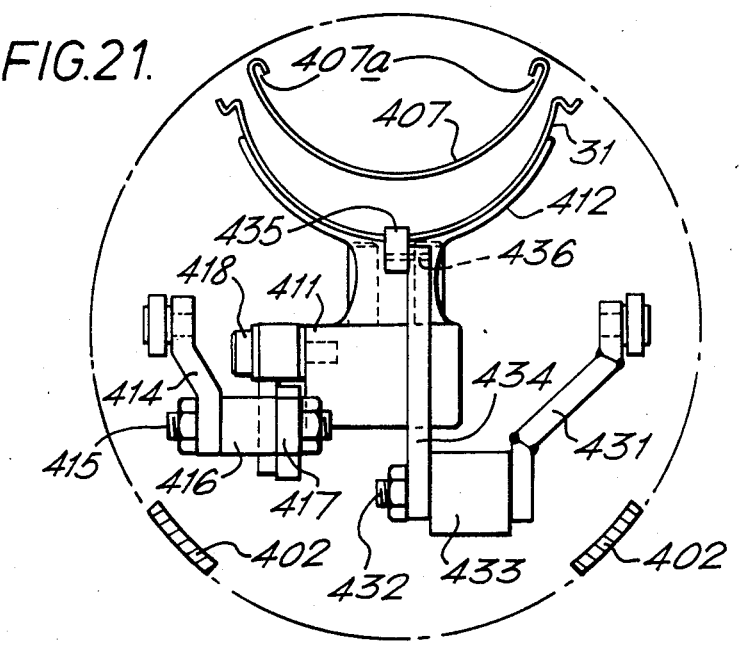
FIG. 21 is a section on the line XXI—XXI of FIG. 18.

Once the hooking arrangement 25 has been brought to its rest position and the drag line has been pulled around the pulley 315 to engage the hooking arrangement and pull the elongate flexible element through the main pipe 20 to the manhole at location B (FIGS. 2 and 3), the elongate flexible element (and also the end of its metal duct) is to be guided into the adjacent side compartment of the clip already installed just beyond the side-connecting pipe. Just rearwardly of the two guides 312, there is a transverse deflector plate 330 mounted to the forward end of and lying above the main shaft 308: this deflector plate 330 is inclined upwardly at a low angle towards the rear of the machine and is provided with an upstanding separator fin 331. Mounted adjacent the front of deflector plate 330, and spaced above it, is a catching strip 332 which projects sideways and downwardly in both directions from the centre of the machine. Mounted to the main shaft 308, and situated below the catching strip 332, is a co-operating catching strip 333 (FIG. 15) which projects sideways and upwardly in both directions from the shaft 308, with its ends hooked (as shown in FIG. 15) around the outer ends of strip 332.

Rearwardly of the deflector plate 330 and catching strips 332, 333, and pivoted to the upper side of the main shaft 308 at 335, is a profiled duct 336. This is resiliently biased to its erect position shown by a torsion spring 337 wound around a pin 338 carried by the main shaft 308, and having a limb acting on the under side of the duct 336: duct 336 is thus capable of being deflected downwards against its spring bias should it strike an obstruction during forward movement of the machine. Duct 336 comprises a sheet metal element bent to the profile shown: the duct has a forward portion with a longitudinal hump 339 in the middle of its floor (FIG. 16), for seating over the shaft 308, and to either side of this central hump the floor has relatively flat portions 340 extending outwardly and upwardly and terminating in upturned side margins 341. These upturned side margins are progressively further upturned from front to rear of the duct 336 and indeed translate into upwardly and inwardly directed portion 342. The floor of the duct rises over an inclined transitional portion 343 (FIG. 13) to a raised, flat floor portion 344 at the rear, where the inwardly directed portions 342 approach each other with their edges parallel. Mounted to the raised floor portion 344 is a further guide 345 comprising a sheet metal element formed to a channel section (FIG. 16) with a concave floor 346 and sides 347 which are directed upwardly and inwardly. At the front, the floor of this guide is rounded (see 348—FIG. 14) and the two side edges of the guide incline down to this. At the rear end of the duct 336, the portions 342 of the latter and the portions 347 of the guide 345 define two upwardly and inwardly inclined passageways (one either side) for guiding the elongate flexible element (which lies in one side or the other of the duct) into the respective side compartment of the installed cable clip.

Thus, once the drag line has been used to pull the elongate flexible element through the main pipe 20, then if the tension on this element is released, it will slide down the respective side of the catching strip 332, and pass between the end of this strip and the hooked end of the underlying strip 333, and come to rest on the latter. Machine M3 is then pulled through the pipe 20 towards the clip which is installed a predetermined distance beyond. The forward side edges of duct 336 impinge upon the upper fingers 35 of the clip, and the forward side edges of guide 345 impinge upon the lower fingers 36 of the clip. The two fingers of each clip compartment are thus displaced generally in the direction of movement of the machine and accordingly apart: as the duct and guide pass through the clip compartments, the elongate flexible element, and the end portion of its metal duct, are guided upwardly and into the respective one of the two clip compartments. The fingers of the two compartments snap closed again as the duct completes its travel relative to them.

FIGS. 18-21 show the machine M4 for applying the stainless steel mesh strip over the installed feeder cable and drop cables and for clipping it to the already-installed plastics clips. The machine comprises a chassis having two upward supports 400, 401 mounted on a pair of parallel skids 402. An hydraulic rotary actuator 403 is mounted between the supports 400, 401, with its axis on the lengthwise axis of the machine. At its forward end, an output shaft 404 of the rotary actuator has mounted thereto a rectangular frame 405 providing a guiding eye for the stip of mesh 40. To the forward end of this frame 405, a closed circuit television camera 406 is mounted, directed rearwardly and upwardly as shown. A guiding channel 407 for the mesh strip is mounted to the rear of the frame 405 and extends upwardly and rearwardly over the top of the rotary actuator 403. Thus, as the machine M4 is pulled through the main pipe 20, with the metal mesh strip having been engaged through the guiding eye 405 and laid in channel 407 when first placed in that pipe, the metal mesh strip will be progressively guided up through eye 405 and along channel 407. As the strip passes along channel 407, it will be shaped to a curved cross-sectional profile suited to the underside of the installed plastics clips. At the rear end of the channel, its side margins are rolled inwardly as at 407a, to receive slidingly the reinforced edges of the metal mesh strip. This strip has previously been laid on the pipe 20 within an elongate plastic bag, and will be in a rolled up, substantially circular configuration: as the machine M4 moves forwardly, the plastics bag must be stripped back from the rolled up mesh strip, for example by pulling the bag from its opposite end. The mesh will retain its rolled up condition as it passes through the eye 405, but will then partially unroll as it passes to the end of channel 407, by which time it adopts the required profile. The closed circuit TV camera 406 provides for observation and then the rotary actuator is controlled to ensure that the eye 405 and channel 407 are turned to follow the path of the installed cables, to apply the mesh strip over these installed cables and their plastics clips.

A rectangular frame 408 is provided for rotation with the output of the rotary actuator, having its front and rear sides coupled to the front and to a rear output shaft of the actuator. To its rear, this frame 408 mounts a mechanism for receiving and applying successive metal clips 31 from a bandolier 409a of such clip: within this bandolier, the metal clips 31 are connected together by the upturned tab 31b (see FIG. 5) of each clip being engaged upwardly through the aperture 31c in the raised, projecting tab 31d of the next-forwardly clip. Two vertical slide rods 409, 409 are mounted on a block 410 fixed to the rear of frame 408, and serve to guide a clip inserting carriage 411 in its vertical movement. For inserting a clip 31 (once this is received on a cradle 412 of the carriage 411), upward driving movement of the carriage 411 is achieved by extending an hydraulic piston and cylinder actuator 413 which is mounted to one side of frame 408. Thus, extension of linear actuator 413 serves to swing a lever 414 and turn a shaft 415 to which it is coupled, shaft 415 being journalled in a projection 416 of the frame 408. This movement causes a crank 417 (attached to shaft 415) to be turned and, because this crank is pivoted at 418 to one side of carriage 411, the latter is driven upwards.

The closed circuit TV camera 406 is used to look rearwardly and focus on the base 32 of an installed cable clip. The rotary actuator serves to turn the camera, the channel 407 and the clip inserting mechanism to the correct orientation, and the camera includes a crossed-wires sight to provide for accurate positioning, and moreover is arranged to focus when it is at precisely the correct axial distance from the installed plastics clip 30 which it is to view. When this condition is reached, the metal clip inserting carriage 411 will be aligned precisely (both circumferentially and axially) with the installed plastics clip: thus, the above-described upwards movement of the carriage 411 will cause the teeth 38 of the metal clip to snap-engage with the recesses 37 of the installed plastics clip 30, passing through the mesh strip to secure it in position. The recessed ears 31e of the clip 31 register with the reinforcing wires 43 of the mesh strip.

A trailer arrangement (FIG. 20) is provided for fine adjustment of the axial position of the machine M4 in the pipe 20. This trailer comprises a piston and cylinder actuator 420 having its piston coupled by a pivot pin 421 to a rearward extension 422 of the machine chassis. At the rear end of the cylinder, a bracket 424 is mounted and a pair of clamping arms 423, 423 are pivoted to this at 425, 425. A piston and cylinder actuator 426 acts between the outer ends of these arms and upon extension urges the arms into engagement with the pipe surface. Having thus locked the rear end of the trailer against axial movement, actuator 420 is now used to adjust the axial position of the main part of the machine M4 until the camera 406 is in focus on the installed plastics clip, as described above. A pair of skids are mounted to a bracket 427.

Once a metal clip 31 has been applied, linear actuator 413 is contracted to lower the carriage 411, but the bandolier 409a must now be advanced to place the next metal clip on the carriage. For this purpose, a piston and cylinder actuator 430 (mounted to the opposite side of frame 408) is contracted, to swing a lever 431 and rotate a shaft 432 which is journalled in a projection 433 from frame 408, and in turn swing a lever 434 forwardly. This lever 434 carries, at its upper end, a pawl 435 which is sprung upwardly about a pivot 436 to lever 434: a hooked nose 437 of the pawl engages in the central aperture 31a of the metal clip (FIG. 5). This movement advances the entire bandolier of metal clips, placing the leading such clip on the carriage 411: it will be appreciated that when this metal clip is lifted by the carriage for clip insertion, its apertured tab 31c will simply be lifted off the upturned tab 31b of the next following metal clip. Linear actuator 430 is next extended to return the pawl 435 to its previous position, wherein its nose will engage within the central aperture of another clip.

Procedures have been described, with reference to FIGS. 2–21, for installing a feeder cable and a plurality of drop cables. As mentioned previously, the ducts housing the drop cables may be secured to the surface of their side-connecting pipes by relining these pipes with a plastics tube, or one alternative would be to pass a machine through each side-connecting pipe to drill holes at intervals and insert clips (suited to the drop cable ducts) as a friction fit into those holes, the drop cable ducts then being applied to these clips. Trunk cables may be installed using the machine M1,M2 and M4 respectively to drill holes and install plastics clips, to form the trunk cable, and to cover it with the metal mesh strip: the plastics clips may correspond to the plastics clip 30 of FIG. 5 but the side compartments could be dispensed with. In all cases, the metal mesh strip forms a barrier to rodents and may be provided, by a dipping process for example, with a coating of an appropriate plastics material to render the mesh less attractive to deposits: the plastics material may form a film over the mesh openings.

Figure 22:
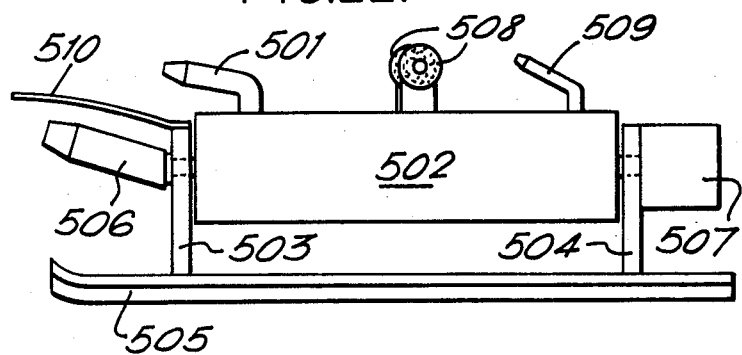
FIG. 22 is a schematic side-view of a pipe descaling machine.
Figure 23:
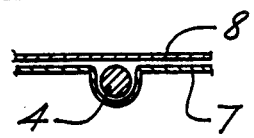
FIG. 23 is a diagrammatic section through a cable with pre-applied adhesive tape.

Prior to running the feeder or trunk cables (or ducts to receive such cables) through the sewer pipes, it is necessary to descale the pipe along a band which follows the intended path of the cable or duct and is at least as wide as the plastics clips and metal cover strip as eventually installed. FIG. 22 shows a highly effective descaling machine, comprising at least one nozzle 501 providing a very high pressure water jet (5,000–10,000 p.s.i) directed forward and upwardly. Nozzle 501 is carried by a body 502 mounted on chassis supports 503, 504 for rotation about the lengthwise axis of the machine, these supports being mounted on a pair of skids 505 for the machine. A closed circuit television camera 506, protected from the water jet by a shield 507, gives operating personnel on the ground a view forwards to enable control of a rotary actuator 507 to adjust the angular position of body 502 and thus direct the water jet onto the pipe surface at the required circumferential points as the machine is pulled through the pipe. The water jet very effectively removes encrustations from the pipe. Should the cables (or their ducts) be secured by adhesive instead of by the clips, the descaling machine may further comprise drying arrangements mounted on the body 505, including for example sponge rollers 508 running on the pipe surface and/or an air jet dryer 509.

Where the cables (or their ducts) are secured to the pipe by adhesive, adhesive tape may be used. A remotely controlled machine is pulled along the pipe, conveying a roll or adhesive tape: it serves progressively to guide the cable or duct to the pipe, for example at its soffit, unroll the adhesive tape and strip back its backing paper, apply the adhesive tape and apply upwards pressure to ensure the required adhesion. The adhesive tape may however already be applied to the cable or duct prior to running the cable through the pipe, as shown in FIG. 23, the cable or duct 4 being disposed along the middle of an adhesive side of the tape 7 (which tape is formed into a channel to accomodate the cable or duct) and the backing paper of layer 8 being applied to this side of the tape so as to enclose the cable or duct. With this arrangement, the machine is arranged progressively to guide the cable or duct to the soffit of the pipe, strip the backing paper 8 and press the cable or duct and tape to the pipe surface.

Figure 24:
FIG. 24 is a diagrammatic section through an extruded duct for housing the cable.

FIG. 24 shows an example of duct to receive a cable, and comprising a flexible, preformed extruded channel section. This duct may be pulled through the pipe and then secured to the pipe roof as just described, for example the surface 9 of the duct may be provided with adhesive and a backing paper which is removed by the machine during operation.

After the cable or duct has been attached as just described, it may be sealed to the pipe surface by applying (e.g. by spraying) a layer of polymeric composition. This is carried out using a remotely controlled machine pulled through the pipe, conveying the sealant (or conveying components of the composition and mixing them at the spray nozzle), and applying it to a controlled thickness to cover the cable or duct and the adjacent margins of the pipe surface. These adhesive installation techniques may be used particularly for the drop cables (or their ducts) in the side-connecting pipes.

I claim:

1. Apparatus for passing through an underground sewage-draining pipe and securing a communication cable against the pipe surface generally at the soffit (top) of the pipe, said apparatus comprising means for drawing a cable means through said pipe, means for progressively lifting said cable means into position generally at the soffit (top) of said pipe, means for applying mechanical fasteners to said pipe at intervals along its soffit, which fasteners serve to secure said cable means to the pipe at intervals, and means for applying a protective covering over said cable means along its length, said protective covering being held in place by said mechanical fasteners.

2. A method of running a communication cable means to a building through underground drainage pipes which are connected to the building, said method comprising the steps of drilling holes through said pipes at spaced apart locations along their length, positioning mechanical fasteners in said drilled holes, extending said comunication cable means through said pipes, and securing said communication cable means to said mechanical fasteners so as to become fixed in position against said pipes.

3. A method as claimed in claim 2, wherein said pipes define upper regions, and wherein said holes are drilled in said pipes in their upper regions so as to be generally above any material flowing through said pipes.

4. A method as claimed in claim 3, wherein the circumferential positioning of said drilled holes varies along said pipes so that the cable means, which is attached to the mechanical fasteners extending therein, will extend adjacent side-connecting pipes.

5. A method as claimed in claim 2, wherein said holes are drilled through said pipes in a radially outward direction.

6. A method as claimed in claim 2, wherein said cable means comprises a cable within a duct.

7. A method as claimed in claim 2, further comprising applying a wire mesh protective covering over said cable means and along its length.

* * * * *